US008556631B2

(12) United States Patent
King et al.

(10) Patent No.: US 8,556,631 B2
(45) Date of Patent: Oct. 15, 2013

(54) SYSTEMS AND METHODS FOR ASSISTING AN EDUCATIONAL INSTITUTION IN RATING A CONSTITUENT

(75) Inventors: Melissa King, West Chester, PA (US); Denise Marie Mendonca, San Diego, CA (US); Patrick Packard, Hingham, MA (US); Martin Donald Reber, Coatesville, PA (US); Robert David Rullo, West Chester, PA (US)

(73) Assignee: Ellucian Company L.P., Malvern, PA (US)

( * ) Notice: Subject to any disclaimer, the term of this patent is extended or adjusted under 35 U.S.C. 154(b) by 887 days.

(21) Appl. No.: 12/027,214

(22) Filed: Feb. 6, 2008

(65) Prior Publication Data

US 2009/0191527 A1   Jul. 30, 2009

Related U.S. Application Data

(60) Provisional application No. 61/023,657, filed on Jan. 25, 2008.

(51) Int. Cl.
*G09B 19/00* (2006.01)
*G06Q 50/00* (2012.01)

(52) U.S. Cl.
USPC ........... 434/238; 434/350; 434/430; 705/326; 705/327; 705/328

(58) Field of Classification Search
USPC ............. 434/219, 307 R, 365, 236, 237, 322, 434/323, 350–352, 362; 705/7, 10, 326, 705/327, 328
See application file for complete search history.

(56) References Cited

U.S. PATENT DOCUMENTS

| 6,484,147 | B1 * | 11/2002 | Brizendine et al. ........ 705/14.27 |
| 6,976,031 | B1 * | 12/2005 | Toupal et al. ........................ 1/1 |
| 7,072,853 | B2 | 7/2006 | Shkedi |
| 7,072,863 | B1 * | 7/2006 | Phillips et al. .............. 705/36 R |
| 7,343,294 | B1 * | 3/2008 | Sandholm et al. .............. 705/10 |
| 7,403,904 | B2 * | 7/2008 | Abe et al. ........................ 705/10 |
| 7,805,382 | B2 * | 9/2010 | Rosen et al. .................. 705/321 |
| 8,057,235 | B2 * | 11/2011 | Kuznar et al. ................. 434/236 |

(Continued)

OTHER PUBLICATIONS

Steven Walzak, "Categorizing university student applicants with neural networks" 1994, IEEE World Congress on Computational Intelligence, vol. 6 pp. 3680-3685.*
Anderson, The Enrollment Management Process, Wayback Machine, http://www.Indiana.edu/~educu750/HosslerAnderson in press.doc, Search Results Jan. 1, 1996 thru Nov. 8, 2007.
Baum, D., "A Lesson in Interactive Marketing", Oracle Magazine, Sep./Oct. 2005, 5 pages.

(Continued)

*Primary Examiner* — Robert J Utama
*Assistant Examiner* — Sadaruz Zaman
(74) *Attorney, Agent, or Firm* — Woodcock Washburn LLP

(57) ABSTRACT

A higher education constituent relationship (CRM) system may provide an educational institution with a graphical display of a probability and desirability value for a person at a stage of a student life cycle. For example, the higher education CRM system may receive a history of interactions between the person and the institution. The higher education CRM system may use the history of interactions and information about the person to calculate the probability value, or measure of the likelihood that the person moves to another stage in the student life cycle, and the desirability value, or a measure of the appeal of the person to the educational institution at a stage of the student life cycle, for the person. The higher education CRM system may display the calculated values for the probability and desirability to a representative of the institution.

24 Claims, 7 Drawing Sheets

(56) References Cited

U.S. PATENT DOCUMENTS

| | | | |
|---|---|---|---|
| 2001/0049692 A1 | 12/2001 | Callaghan et al. | |
| 2002/0116253 A1* | 8/2002 | Coyne et al. | 705/10 |
| 2002/0120614 A1* | 8/2002 | Kelly | 707/3 |
| 2003/0110215 A1* | 6/2003 | Joao | 709/203 |
| 2004/0081951 A1* | 4/2004 | Vigue et al. | 434/350 |
| 2004/0138913 A1* | 7/2004 | Guerra | 705/1 |
| 2004/0143469 A1 | 7/2004 | Lutz et al. | |
| 2005/0159999 A1* | 7/2005 | Totten et al. | 705/14 |
| 2006/0069576 A1* | 3/2006 | Waldorf et al. | 705/1 |
| 2006/0106667 A1* | 5/2006 | Coyne | 705/10 |
| 2006/0167780 A1* | 7/2006 | Friedman | 705/35 |
| 2007/0269786 A1* | 11/2007 | Jeon | 434/323 |
| 2007/0292834 A1* | 12/2007 | Ransdell | 434/350 |

OTHER PUBLICATIONS

Best Practices in Enrollment Marketing Management, White Paper, eLearners.com, 2007, 22 pages.
"DNN for Higher Education", EMAS Pro, 2007, 2 pages.
Munoz, C. et al., "Personalization and the Admissions Website", Case Study: University of Dayton, Sep. 18, 2001, http://admission.udayton.edu, University of Dayton & Liquidmatrix Corporation, 13 pages.
Thomas, E. et al., "Using Predictive Modeling to Target Student Recruitment: Theory and Practice", The Association for Institutional Research for Management Research, Winter 2001, 78, 12 pages.
Yam, R. et al., "Return on Investment in International Recruitment: A Qualitative Study", May 31, 2007, NAFSA Conference, 38 pages.
University of Missouri System, "Lifetime Student Relationship Management", PeopleSoft, 2002-2004, 21 pages.

* cited by examiner

FIG. 4A

SYSTEMS AND METHODS FOR ASSISTING AN EDUCATIONAL INSTITUTION IN RATING A CONSTITUENT

CROSS-REFERENCE TO RELATED APPLICATIONS

This application claims benefit under 35 U.S.C. § 119(e) of provisional U.S. patent application No. 61/023,657 filed on Jan. 25, 2008, which is incorporated herein by reference.

BACKGROUND

Today, many educational institutions such as colleges, universities, or the like may track a person throughout his or her educational stages. For example, the educational institutions may track the person during the recruitment process, the application process, as a student, and as an alumnus. To track the person, the educational institutions may rely upon representatives such as recruiters, advisors, alumni organizations, or the like to keep in contact with the person. Unfortunately, there are numerous people at each of the educational stages that the representatives may need to contact. Thus, the representatives may need to make a decision on which person to contact more often at each stage. Such a decision may be difficult for the representative, because the educational institutions may not have the ability to rate the person throughout each educational stage to help determine, for example, whether the person should be contacted more often.

SUMMARY

Methods and systems are provided that may assist an educational institution in rating a person in connection with one or more stages of a student life cycle. In one embodiment, a history of interactions between the person and the educational institution may be received by a higher education constituent relationship management (CRM) system. The higher education CRM system may calculate, based in part on the received history of interactions and information about the person, a first value that may represent a measure of the likelihood that the person moves to a subsequent stage in the student life cycle and a second value that may represent a measure of the appeal of the person to the educational institution at a stage of the student life cycle. The higher education CRM system may then graphically display the first value and the second value. According to an example embodiment, a representative of the education institution may log onto the higher education CRM system to view the graphically displayed first and second value.

BRIEF DESCRIPTION OF THE DRAWINGS

FIGS. 4A-4C depict example embodiments of interfaces that may be presented by a higher education CRM system to a representative of an institution.

DETAILED DESCRIPTION OF ILLUSTRATIVE EMBODIMENTS

Figure 1:
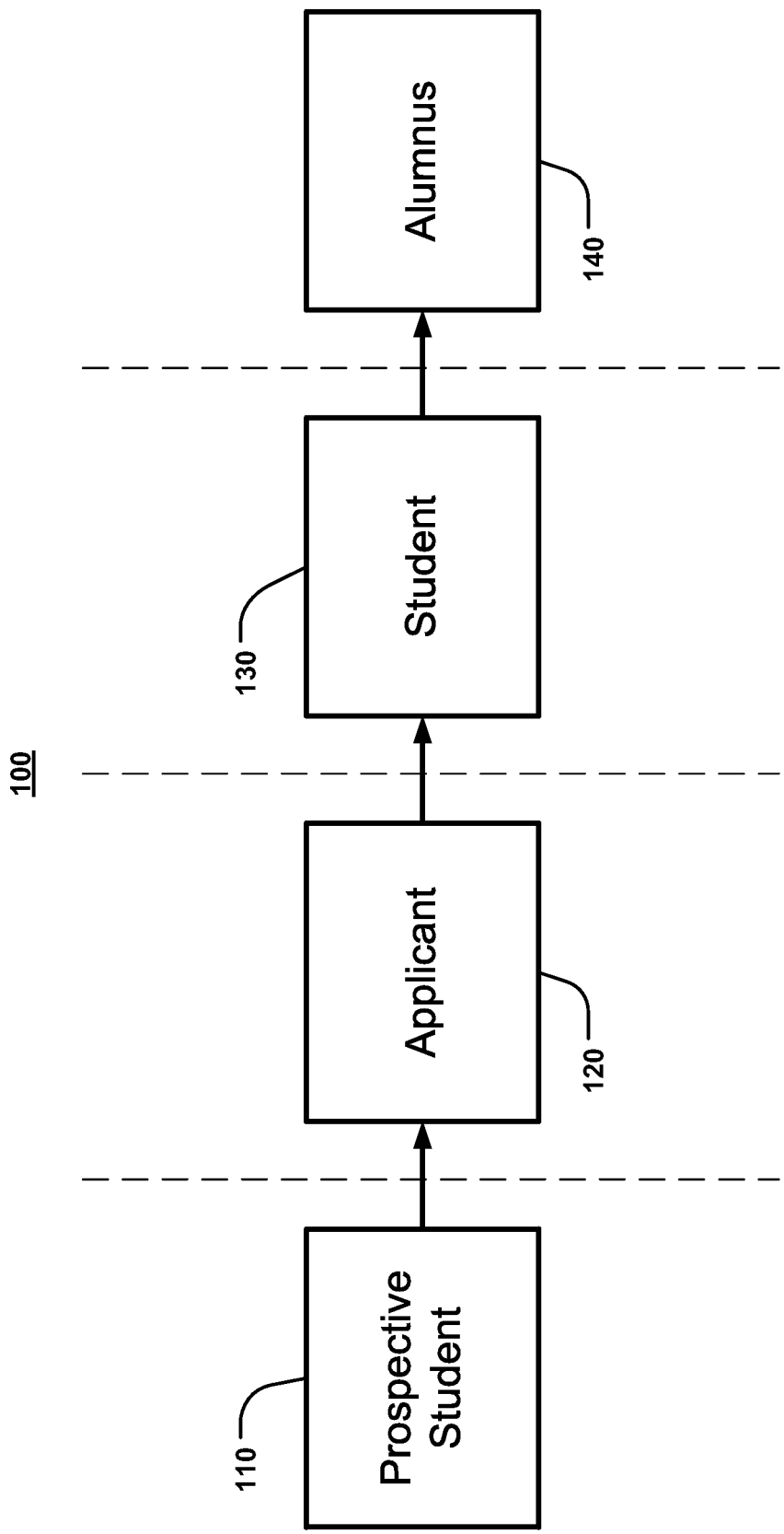
FIG. 1 depicts an example embodiment of a student life cycle.

FIG. 1 depicts an example embodiment of a student life cycle 100. The student life cycle 100 may comprise a plurality of educational stages of a person (i.e., constituent); the constituent may pass from one educational stage to another educational stage as the person progresses along the lifecycle. For example, as shown in FIG. 1, along the student life cycle 100, a constituent may pass from a prospective student stage 110 to an applicant stage 120, from the applicant stage 120 to a student stage 130, from the student stage 130 to an alumnus stage 140, or the like.

Figure 2:
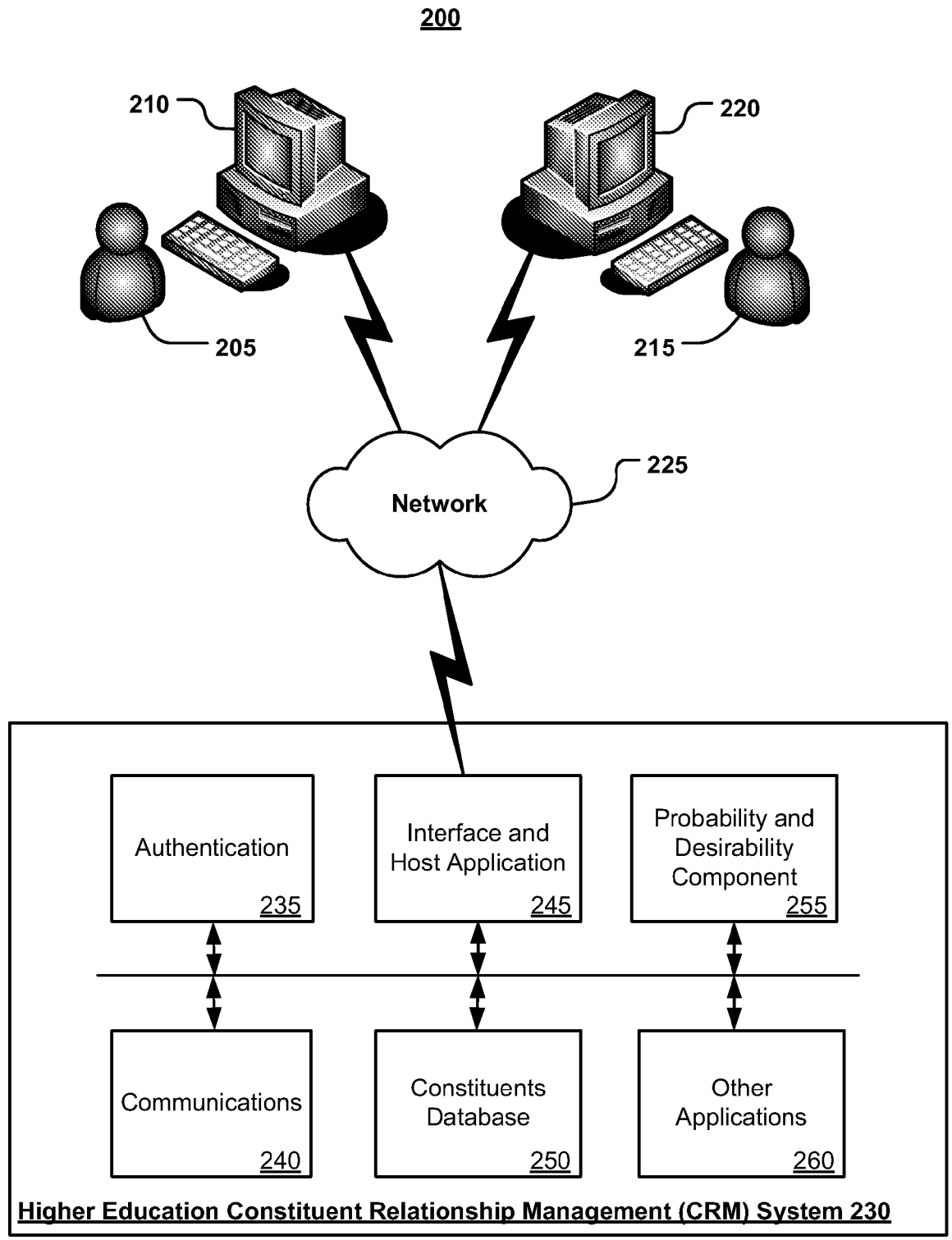
FIG. 2 depicts an example embodiment of a higher education constituent relationship management (CRM) system in communication with a constituent and a representative of an educational institution.

FIG. 2 depicts an example embodiment 200 of a higher education constituent relationship management (CRM) system 230 in communication with a constituent 205 and a representative 215 of an educational institution. The educational institution may include, for example, a college, a university, or the like. According to one embodiment, the constituent 205 may be a prospective student of the educational institution at the prospective student stage 110, an applicant of the educational institution at the applicant stage 120, a student of the educational institution at the student stage 130, or an alumnus of the educational institution at the alumnus stage 140 in the student life cycle 100, shown in FIG. 1. The representative 215 may be an administrator, a professor, a recruiter, or any other representative of the educational institution such that the representative 215 may be responsible for interacting with the constituent 205.

The constituent 205 and the representative 215 may communicate with the higher education CRM system 130 using, for example, electronic devices 210 and 220, respectively. The electronic devices 210 and 220 may include hardware components such as a processor, a graphics card, a storage component, a memory component, a memory card reader, an antenna, a communication port, a disc drive, or the like. The electronic devices 210 and 220 may also include software components such as an operating system that may control the hardware components. The electronic devices 210 and 220 may include any other suitable components such that the constituent 205 and the representative 215 may interact with, for example, interfaces provided by the higher education CRM system 230, which will be described in more detail below. According to example embodiments, the electronic devices 210 and 220 may be computers, cellular telephones, Personal Data Assistants (PDAs), servers, or the like.

The electronic devices 210 and 220 may be in communication with the higher education CRM system 230 via a network 225. The network 225 may be any network, such as a Local Area Network (LAN), a Wide Area Network (WAN), the Internet, or the like. The higher education CRM system 230 may include any combination of hardware components such as processors, databases, storage drives, registers, cache, RAM memory chips, data buses, or the like and/or software components such as operating systems, database management applications, or the like. According to an example embodiment, the higher education CRM system 230 may be a network-based server that may provide interfaces to the constituent 205 and the representative 215.

As shown in FIG. 2, the higher education CRM system 230 may include an authentication module 235, a communications module 240, an interface and host application 245, a constituents database 250, a probability and desirability component 255, and other applications modules 260. The authentication module 235, the communications module 240, the interface and host application 245, the constituents database 250, the probability and desirability component 255, and the other applications module 260 may be in operative communication with each other via, for example a bus or any other subsystem that may transfer data between components and modules in the higher education CRM system 230. In an example embodiment, the authentication module 235, the communications module 240, the interface and host application 245, the constituents database 250, the probability and desirability component 255, and the other applications modules 260 may be implemented as software executing on a processor of the higher education CRM system.

The interface and host application 245 of the higher education CRM system 230 may interface with the network 225 to provide interaction between the electronic devices 210 and 220 and various components and features of the higher education CRM system 230, for example. The interface and host application 245 may include software components such as operating systems, Web-based management applications, or the like such that the interface and host application 245 may provide the overall infrastructure and may be the primary consumer of constituent information, interactions, probability values, desirability values, or the like that may be stored, calculated, and published by the higher education CRM system 230. The interface and host application 245 may also serve to interact and interface with the other functional components of the higher education CRM system 230 including the authentication module 235, the communications module 240, the constituents database 250, the probability and desirability component 255, and the other applications module 260.

In one embodiment, the interface and host application 245 may present a constituent-based Web interface to the constituent 205 via the electronic device 210. For example, the interface and host application 245 may provide an interface to handle the submission of educational institution requests such as scheduling campus visits, requesting applications, applying to the institution electronically, requesting information regarding extra curricular activities available, or the like from the constituents 205 using the electronic device 210. According to one embodiment, the interface and host application 145 may record the occurrence of one or more interactions between the constituents 205 and the higher education CRM system 230 and provide a history of such interactions to the constituents database 250, which will be described in more detail below.

The interface and host application 145 may also present a representative-based Web interface to the representative 215 via the electronic device 220. For example, the interface and host application 245 may provide an interface to handle requests by a representative for constituent personal information, constituent test information, a probability and desirability value associated with a constituent, information about constituent interactions with the higher education CRM system 230, or the like.

The authentication module 235 may include any combination of hardware components such as processors, databases, storage drives, registers, cache, RAM memory chips, data buses, or the like and/or software components such that the authentication module 235 may provide a mechanism for authentication of the constituent 205 and the representative 215 before educational institution information, constituent information, or the like may be provided by the higher education CRM system 230. Typically, the constituents and representatives such as the constituent 205 and the representative 215 may be authenticated by supplying a credential such as a social security number, username, student identification number, Personal Identification Number (PIN), password, or the like before the higher education CRM system 230 may be used.

The authentication module 235 may be used to determine whether a constituent or a representative of the educational institution may be accessing the higher education CRM system 230. For example, the authentication module 235 may use the supplied credential to determine whether a constituent or a representative may be accessing the higher education CRM system 230. If the authentication module 235 determines the supplied credential corresponds to a representative, the authentication module 235 may provide access to the higher education CRM system 230 associated with a representative. Likewise, if the authentication module 235 determines the supplied credential corresponds to a constituent, the authentication module 235 may provide access to the higher education CRM system 230 associated with a constituent.

The higher education CRM system 230 may also include the communications module 240. The communications module 240 may include any combination of hardware components such as processors, databases, storage drives, registers, cache, RAM memory chips, data buses, or the like and/or software components. The constituent 205, the representative 215, and/or processes internal to the higher education CRM system 230 may use the communications module 140 to manipulate, display, or manage data such as constituent information, probability values, desirability values, educational institution information, or the like that may be provided by the higher education CRM system 230 to constituents or representatives, for example. The communications module 240 may be used to deliver information to the constituents or representatives in a variety of ways including, but not limited to, Hypertext Transfer Protocol (HTTP) and/or Secure Hypertext Transfer Protocol (HTTP/S) for simple Web-based access, Simple Main Transfer Protocol (SMTP) for e-mail notifications, Web Services/Simple Object Access Protocol (SOAP) for a programmatic way to access the information, and Sharepoint for online review and collaboration of the information. For example, according to one embodiment, the communications module 240 may be used to provide interfaces such as Web pages that may be delivered to the constituent 205 or the representative 215 via HTTP. In an example embodiment, the communications module 240 may be used to provide an interface to the representative 215 that may include a graphical depiction of a probability and desirability value associated with a constituent such as the constituent 205, which will be described in more detail below.

The higher education CRM system 230 may further include the constituents database 250. The constituents database 250 may be adapted to store personal information, academic information, information about interactions (hereinafter sometimes simply referred to as "interactions"), probability values, desirability values, or the like for each of the constituents associated with the educational institution. The constituents database 250 may include, for example, any suitable hardware component designed to store data such as interactions, personal information, academic information, probability values, desirability values, or the like. According to one embodiment, the personal information, academic information, interactions, probability values, desirability values, or the like that may be stored in the constituents database 250 may be indexed by the credential of the constituent, such as the constituent's account number, username, Personal Identification Number (PIN), password, or the like that may be required to access the higher education CRM system 230. For example, constituents database 250 may include a list of information associated with each of the constituents. The list may be implemented as a tree within the constituents database 250 such that the credential of a constituent may be the root of the tree. Alternatively, the list may be organized as a hierarchy with the credential being the top of the hierarchy.

According to an example embodiment, the higher education CRM system 230 may include the probability and desirability component 255. The probability and desirability component 255 may include any combination of hardware components such as processors, databases, storage drives, registers, cache, RAM memory chips, data buses, or the like and/or software components such as operating systems, database management applications, or other software modules or components or the like. In one embodiment, the probability and desirability component 255 may determine both a probability value and a desirability value for a constituent, as described in more detail below.

The higher education CRM system 230 may further include other applications modules 260. Other applications modules 260 may include any combination of hardware components such as processors, databases, storage drives, registers, cache, RAM memory chips, data buses, or the like and/or software components such as operating systems, database management applications, or the like. For example, the other applications modules 260 may include a software application that may be used to customize rules or weights that may be associated with interactions or information of the constituents. The other applications modules 260 may also include additional software that may be used to manipulate, manage, or query constituent information and interactions.

Figure 3:
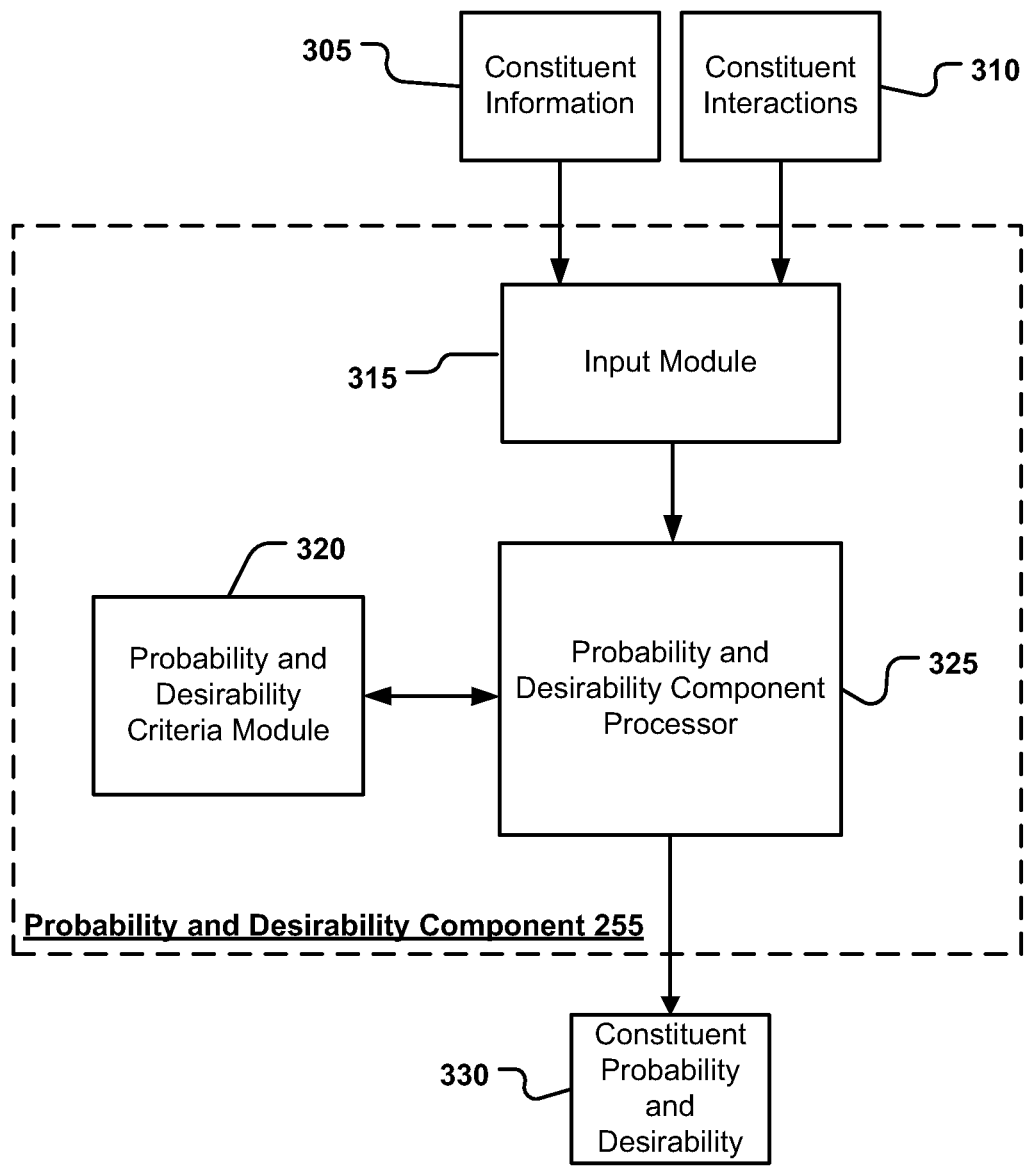
FIG. 3 depicts an example embodiment of a probability and desirability component of a higher education CRM system.

FIG. 3 depicts an example embodiment of a probability and desirability component 255 of a higher education constituent relationship management (CRM) system. The probability and desirability component 255, and any of the individual components thereof illustrated in FIG. 3, may be implemented using software, hardware, or a combination of both, and may include components such as, but not limited to, servers, databases, microchips, storage devices, processors, programmed modules, or the like.

As shown in FIG. 3, the probability and desirability component 255 may include an input module 315. In one embodiment, the input module 315 may receive and store constituent information 305 and constituent interactions 310 that may be used to calculate a probability value for the constituent. As used herein and in the claims, the term "probability value" means a value that represents or measures the likelihood that the constituent (i.e., person) moves to a subsequent stage in the stages of the student life cycle. The information 305, 310 may also be used to calculate a desirability value for the constituent. As used herein and in the claims, the term "desirability value" means a value that represents or measures the appeal of the person to the educational institution at a stage of the student life cycle. The constituent information 305 and the constituent interactions 310 may be received from, for example, the constituents database 250, shown in FIG. 2.

The constituent information 305 may include, for example, test scores and percentiles, such as SAT scores; grade point average; legacy information such as whether other family members attended the educational institution; socioeconomic class; geographic location; extra curricular activities such as sports, band, or the like; gender; major; minor; concentration; military service; entry level such as undergraduate, graduate, professional school, or the like; full or part time status; generation information such as whether the constituent is a first generation higher education student; economic contribution to the education institution; or any other information associated with the constituent at a stage in the student life cycle.

The constituent interactions 310 may include, for example, the number of times a constituent accesses a website hosted by the educational institution; the information surfed at the website hosted by the educational institution; whether the constituent has created or recently used an account to access the website hosted by the education institution; whether the constituent has scheduled visits to the educational institution; whether the constituent has made telephone calls to the educational institution; whether the constituent applied to or requested application materials from the educational institution; whether the constituent attended an open house, alumni event, departmental event of the educational institution; or any other interaction between the constituent and the educational institution at a stage in the student life cycle.

The probability and desirability component 255 may further include a probability and desirability criteria module 320 that may be configured to store information that may be used to calculate the probability value and the desirability value for each of the constituents at a stage in the student life cycle.

The probability and desirability criteria module 320 may store one or more weights for each possible interaction and piece of information associated with constituents at a stage in the student life cycle. For example, in one embodiment, the probability and desirability criteria module 320 may store a numerical weight or value associated with each possible interaction and piece of information at a stage in the life cycle. Alternatively, the probability and desirability criteria module 320 may store a first numerical weight or value that may be used to calculate the probability value and a second numerical weight or value that may be used to calculate the desirability for each possible interaction and piece of information.

Additionally, the probability and desirability criteria module 320 may store a different weight for each possible interaction and possible piece of information at a particular stage in the student life cycle. For example, at the prospective student stage, geographic location information may be assigned a numerical weight that may be larger than the numerical weight associated with the same geographic location at the alumnus stage. Thus, according to one embodiment, the numerical weights or values that may be associated with each possible interaction or piece of information may depend on the stage a constituent may be at in a student life cycle.

The probability and desirability criteria module 320 may also store one or more rules that may be used to calculate the probability value and the desirability value. For example, the probability and desirability criteria module 320 may include one or more rules that determine which interactions and information should be used to calculate the probability value and which interactions and information should be used to calculate the desirability value.

Additionally, the probability and desirability criteria module 320 may include one or more rules that assign a number to the probability value and the desirability value based on the constituent information and constituent interactions. For example, if a constituent may have accessed the website 4 times, scheduled a campus visit, resides in geographic location A, the constituent may be assigned a probability value of 61, or the constituent may be placed in a particular percentile associated with a probability value of 61, based on a rule stored in the probability and desirability criteria module 320. Thus, if a constituent may include certain information and interactions, the constituent may be assigned a probability value and a desirability value based on such information and interactions.

According to one embodiment, the probability value and desirability value may be assigned based on historical information and interactions. For example, the higher education CRM system 230, shown in FIG. 2, may track and store information and interactions from previous constituents at a stage in the student life cycle. Based on the information and interaction of the previous constituents, one or more rules that may be used to assign a probability value and a desirability value to constituents at the same stage may be stored in the probability and desirability criteria module 320. For example, if 100 previous constituents had information A and B and interactions C and D, and 50 of those previous constituents moved to a subsequent stage in a student life cycle, the number 50 may be assigned to as the probability value for constituents currently at the same stage having information A and B and interactions C and D.

The probability and desirability criteria module 320 may also store one or more rules that provide multiplicative values, thresholds, divisor values, or the like that may be applied to a weight associated with a possible interaction or piece of information. For example, the probability and desirability criteria module 320 may store a rule that multiplies a weight for an interaction by 2 when calculating the probability value and subtracts the weight by a threshold of 10 when using the same interaction to calculate the desirability value.

According to one embodiment, the rules may vary depending upon whether the probability value or the desirability value may be calculated for the information. Additionally, the educational institution may customize the rules and weights associated with the constituent information and constituent interactions.

The probability and desirability component 255 may further include a probability and desirability processor component 325. The probability and desirability processor component 325 may be in operative communication with the input module 315 and the probability and desirability criteria module 320, as shown in FIG. 3. The probability and desirability processor component 325 may include, for example, a standard processor, a specialized processor, or the like.

The probability and desirability processor component 325 may calculate the probability value and the desirability value for each of the constituents at a particular stage in a student life cycle. For example, in one embodiment, the probability and desirability processor component 325 may compare the constituent information 305 and the constituent interactions 310 with the potential interactions and information stored in the probability and desirability criteria module 320. If the constituent information 305 matches potential information and the constituent interactions 310 match potential interactions in the probability and desirability criteria module 320, the weights associated with each piece of information and each interaction that match may be received and added together by the probability and desirability component processor 325 to calculate the constituent probability value and desirability value 330. As described above, the weights may vary depending upon the stage in the student life cycle and the value (probability or desirability) being calculated.

Additionally, the probability and desirability processor component 325 may compare the one or more rules stored in the probability and desirability criteria module 320 to the constituent information 305 and the constituent interactions 310. As described above, the probability and desirability processor component 325 may use the rules to modify the weights associated with each potential interaction and piece of information that may match the constituent information 305 and the constituent interactions 310. The probability and desirability processor component 325 may then used the modified weights to calculate the constituent probability value and desirability value 330. Additionally, as described above, the probability and desirability processor component 325 may use the rules to determine and assign a number for the constituent probability value and the desirability value 330 based on the combination of the constituent information 305 and constituent interactions 310. According to one embodiment, the constituent probability and desirability value 330, calculated by the probability and desirability processor component 325, may be stored in the constituents database 250 with the other information associated with the constituent.

The probability and desirability processor component 325 may also be used to calculate an average probability value and an average desirability for all of constituents at a particular stage in the student life cycle. For example, the probability and desirability processor component 325 may add each probability value for each constituent at a particular stage and each desirability value for each constituent at the particular stage. The probability and desirability processor component 325 may then divide the added probability values and desirability values by the total number of constituents at the particular stage to calculate the average probability and desirability values.

Figure 4A:
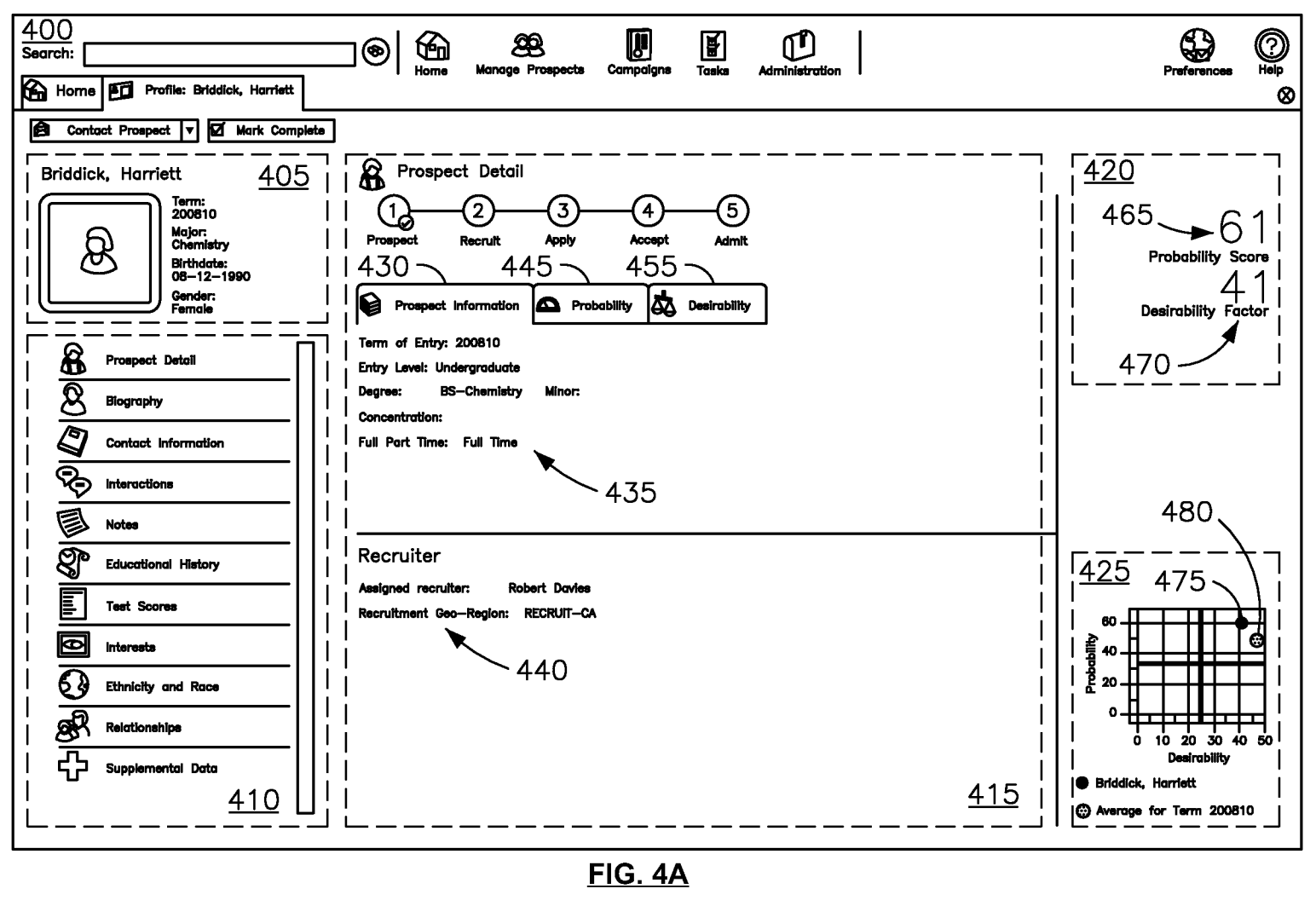
Figure 4B:
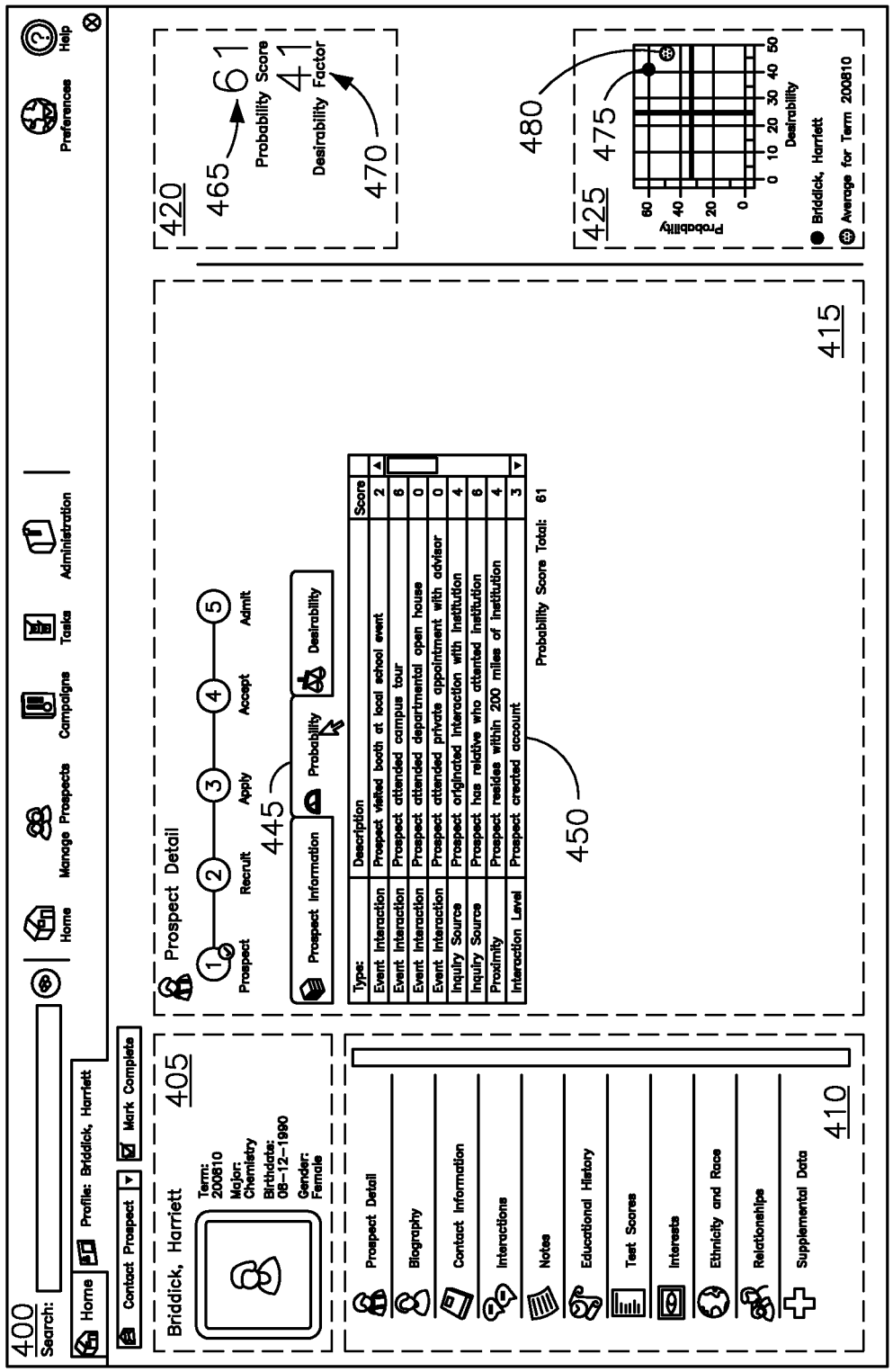
Figure 4C:
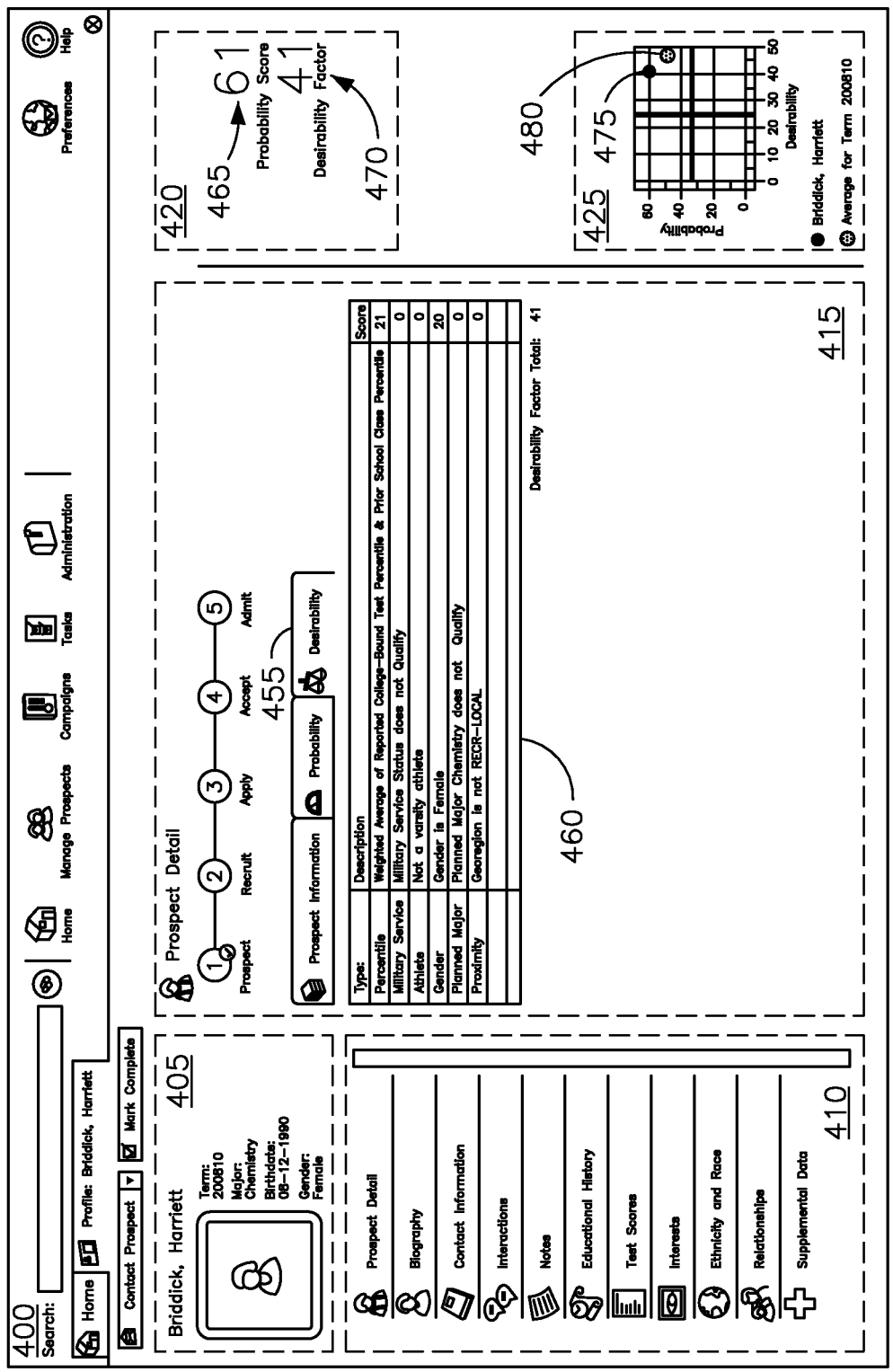

FIGS. 4A-4C depict example embodiments of an interface 400 that may be presented by a higher education CRM system to a representative of an institution. As shown in FIGS. 4A-4C, the interface 400 may be a Web page generated using, for example, HTML, Java, or the like. According to one embodiment, the representative 215 shown in FIG. 2 may log into the higher education CRM system 230 via the electronic device 220 by supplying credentials such as an account number, a username, a PIN, a password, or any other unique identifier for the representative 215. Upon logging onto the higher education CRM system 230, the representative 215 may select a constituent such as the constituent 205 that the representative 215 may wish to review. The communications module 240 may receive constituent information, a probability associated with the constituent, and a desirability associated with the constituent. The communications module 240 may then provide the constituent information, probability value, and desirability value to the representative 215 via the interface and host application 245, for example.

As shown in FIG. 4A-4C, the interface 400 may include constituent information block 405, an options block 410, a constituent detail block 415, probability and desirability values 420, and a probability and desirability graph 425. According to one embodiment, the constituent information block 405 may include personal information associated with a constituent selected for review by the representative 215. For example, the constituent information block 405 may include the name, prospective major, birthdate, gender, or any other suitable personal information associated with the selected constituent.

The interface 400 may further include options block 410. The options block 410 may include one or more options that may be selected by the representative 215 to view additional information such as additional academic and personal information associated with the selected constituent. In an example embodiment, the options in the options block 410 may be clickable links such that when the representative 215 clicks a link of one of the options, a new block with information corresponding to the clicked option may replace the constituent detail block 415. For example, if the representative 215 selects the interaction option, an interaction block (not shown) that may have a list of interactions performed by the selected constituent may replace the constituent detail block 415. The representative 215 may then review such information in the interactions window instead of the information of the constituent detail block 415.

The constituent detail block 415 may include educational information associated with a selected constituent in one of the educational stages in the student life cycle such as student life cycle 100, shown in FIG. 1. According to an example embodiment, the constituent detail block 415 may include one or more clickable tabs such as a constituent information tab 430, a probability tab 445, and a desirability tab 445. The representative 215 may select a tab to receive additional information associated with the selected constituent. For example, as shown in FIG. 4A, the representative 215 may select the prospect information tab 430 to view recruiter information 440 such as the assigned recruiter's name, geographical region, or the like and curricula information 435 such as a major, a minor, a concentration, a degree, an entry level, full or part-time status, or the like associated with the selected constituent.

As shown in FIG. 4B, the representative 215 may select the probability tab 445 to view the interactions and information that may be used to calculate the probability value for the educational institution. The interactions and information may be displayed in a probability chart 450. The probability chart 450 may include a column for the type of interaction or information, a description of the interaction or information, and a weight associated with the interaction or information. As described above, the educational institution may customize the interactions and information used to calculate the probability value such that the probability chart 450 may display the interactions and information selected by the educational institution to calculate the probability value.

As shown in FIG. 4C, the representative 215 may select the desirability tab 455 to view the interactions and information that may be used to calculate the desirability value for the educational institution. The interactions and information may be displayed in a desirability chart 460. The desirability chart 460 may include a column for the type of interaction or information, a description of the interaction or information, and a weight associated with the interaction or information. As described above, the educational institution may customize the interactions and information used to calculate the desirability value such that the desirability chart 460 may display the interactions and information selected by the educational institution to calculate the desirability value.

The interface 400 may further include the probability and desirability values 420 and the probability and desirability graph 425. The probability and desirability values 420 may include a first value 465 and a second value 470. According to the example embodiment shown, the first value 465 may be calculated by adding together each of the weights for the information and interactions in the probability chart 450, shown in FIG. 4B, and the second value 470 may be calculated by adding together each of the weights for the information and interactions in the desirability chart 460, shown in FIG. 4C.

The probability and desirability graph 425 may include a first axis that may represent the probability that the constituent moves to the subsequent stage in the stages of the student life cycle. The first axis may include a first range of potential values for the likelihood that the constituent moves to the subsequent stage in the stages of the student life cycle. According to one embodiment, the first range may be defined by the representative as a constant range such as 0-100. The first range may also be defined automatically between the lowest possible value of the first value to the highest possible value of the first value. Alternatively, the first range may be dynamic such that the first range may depend on the first value. For example, if the first value may be 61, the first range may be from the lowest possible value such as 0 to a value slightly higher than the first value such as 70.

The probability and desirability graph 425 may include a second axis that may represent the desirability of the constituent to the educational institution at the stages of the student life cycle. The second axis may include a second range of potential values for the appeal of the constituent to the educational institution at the stages of the student life cycle. According to one embodiment, the second range may be defined by the representative as a constant range such as 0-100. The second range may also be defined automatically between the lowest possible value of the second value to the highest possible value of the second value. Alternatively, the second range may be dynamic such that the second range may depend on the first value. For example, if the second value may be 41, the first range may be from the lowest possible value such as 0 to a value slightly higher than the first value such as 50.

According to one embodiment, the first value 465 and the second value 470 may be graphically displayed as a first point 475 on the probability and desirability graph 425. The first point 475 may be plotted on the graph at the first value 465 along the first axis and at the second value 470 along the second axis.

The probability and desirability graph 425 may further include a second point 480 in an example embodiment. The second point 480 may be defined by a third value and a fourth value. The third value may represent an average measure of the likelihood that a plurality of persons move to a subsequent stage in the stages of the student life cycle. Thus, in one embodiment, the third value may represent an average that every student at a particular stage may move to the subsequent stage in the student life cycle. The fourth value may represent an average measure of the appeal of a plurality of persons to the educational institution at the stages of the student life cycle. Thus, in one embodiment, the fourth value may represent an average appeal for every student at a particular stage in the student life cycle.

Figure 5:
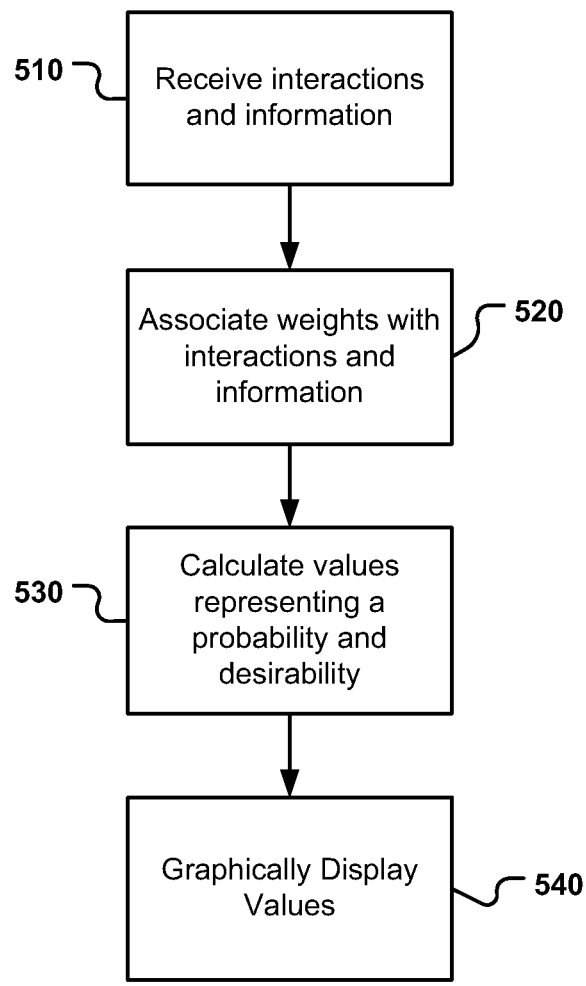
FIG. 5 depicts an example method for assisting an educational institution in rating a person in connection with one or more stages of a student life cycle.

FIG. 5 depicts an example method 500 for assisting an educational institution in rating a person in connection with one or more stages of a student life cycle. At 510, a higher education constituent relationship management (CRM) system may receive a history of interactions between a person and an educational institution. For example, the person may include a constituent at one or more stages of the student life cycle such as a prospective student, an applicant, a student, or an alumnus of the educational institution. The higher education CRM system may receive a history of interactions between such person and the educational institution. For example, in one embodiment, the higher education CRM system may receive an interaction recorded between the person and an interface provided by the educational institution.

At 520, the higher education CRM system may associate a weight with the history of interactions and information about the person that may be stored in the higher education CRM system. For example, each interaction and each piece of information about the person may be assigned a numerical weight. The numerical weight may be customized by the educational institution. For example, the educational institution may select a numerical weight for each interaction or piece of information at each stage in the life cycle. Additionally, the educational institution may select a set of rules that may be used to determine the numerical weight for each interaction or piece of information at each stage in the life cycle.

According to one embodiment, the weight associated with each interaction or piece of information may depend on the value being calculated by the higher education CRM system. For example, each interaction and piece of information may be assigned two weights. A first weight may be associated with a measure of the likelihood that the person moves to a subsequent stage in the one or more stages of the student life cycle and a second weight may be associated with a measure of the appeal of the person to the educational institution at the one or more stages of the student life cycle At 530, the higher education CRM system may calculate, based in part on the history of interactions and the information about the person, a first value representing the probability that the person moves to a subsequent stage in the stages of the student life cycle. At 530, the higher education CRM system may also calculate, based in part on the history of interactions and the information about the person, a second value representing the desirability of the person to the educational institution at a stage of the student life cycle.

According to one embodiment, the weight that may be associated with each interaction in the history of interactions and the information about the person may be used to calculate the first value and the second value. If a first weight and a second weight is associated with each interaction and piece of information, the first weights may be added to calculate the first value and the second weights may be added together to calculate the second value.

If one weight may be associated with each interaction and piece of information, one or more rules may be used to calculate the first value and the second value using the weights according to another embodiment. For example, in calculating the first value, a weight for a first interaction may be multiplied by a first number or increased by the first number. The resulting weight may be added to additional interaction weights to calculate the first value. In calculating the second value, the weight for the first interaction may be divided by a second number or reduced by the second number. The resulting weight may be added to additional interaction weights to calculate the second value. Additionally, some interactions and corresponding weights may be used to calculate the first value, but not be used to calculate the second value, and vice-versa.

The higher education CRM system may also assign a first value and a second value based on the combination of the information about the person and the history of interactions using the one or more rules. For example, if the history of interactions include a scheduled campus visit and a 4 visits to the website and the information about the person includes geographic location A, then a first number may be assigned to the first value. The same or a different rule may be applied to determine the second number. If the same rule may be applied to calculate the second value, a second number, that may be different than the first number, may be assigned to the second value even though the same combination of interactions and information may be used.

At 530, the higher education CRM system may also calculate a third value representing an average probability that a plurality of persons move to a subsequent stage in the stages of the student life cycle and a fourth value representing an average desirability of a plurality of persons to the educational institution at a stage of the student life cycle. For example, the higher education CRM system may add together each of the first values for each person at a particular stage in the student life cycle. The higher education CRM system may then divide the added first values by the number of persons at that particular stage to calculate the third value. Similarly, the higher education CRM system may add together each of the second values for each person at that particular stage in the student life cycle. The higher education CRM system may then divide the added second values by the number of persons at that particular stage to calculate the fourth value.

At 540, the higher education CRM system may graphically display the first value and the second value. For example, the first value and the second value may be graphically displayed as a first point on a graph, as illustrated, for example in FIG. 4C. The graph may include a first axis representing the measure of the likelihood that the person moves to the subsequent stage in the one or more stages of the student life cycle. The graph may also include a second axis representing the measure of the appeal of the person to the educational institution at the one or more stages of the student life cycle. The first point may be plotted on the graph at the first value along the first axis and at the second value along the second axis.

According to one embodiment, at 540, the third value and the fourth value may also be graphically displayed as a second point on the graph such that the second point may be plotted on the graph at the third value along the first axis and at the fourth value along the second axis.

The methods and apparatus of the present invention may be embodied in the form of computer executable instructions (i.e., program code) stored on a computer-readable storage medium. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer.

As the foregoing illustrates, the present invention is directed to methods and systems that calculate a first value representing a probability that a constituent (i.e., a person) moves to a subsequent stage in the stages of the student life cycle and a second value representing a desirability of the person to the educational institution at a stage in the student life cycle. It is understood that changes may be made to the embodiments described above without departing from the broad inventive concepts thereof. Accordingly, it is understood that the present invention is not limited to the particular embodiments disclosed, but is intended to cover all modifications that are within the spirit and scope of the invention as defined by the appended claims.

What is claimed:

1. A computer-implemented method for assisting an educational institution in rating a person in connection with one or more stages of a student life cycle, the method comprising:
   receiving, by a processor of a computer system, a history of interactions between the person and the educational institution;
   calculating, by the processor, based in part on the history of interactions and information about the person, a probability value representing a measure of the likelihood that the person moves to a subsequent stage in the one or more stages of the student life cycle;
   calculating, by the processor, based in part on the history of interactions and information about the person, a desirability value representing a measure of the appeal of the person to the educational institution at the one or more stages of the student life cycle; and
   graphically displaying on an electronic device the probability value and the desirability value as a point on a graph.

2. The method of claim 1, wherein the graph comprises a first axis representing the measure of the likelihood that the person moves to the subsequent stage in the one or more stages of the student life cycle and a second axis representing the measure of the appeal of the person to the educational institution at the one or more stages of the student life cycle.

3. The method of claim 2, wherein the point is plotted on the graph at the probability value along the first axis and at the desirability value along the second axis.

4. The method of claim 3, wherein the point is a first point, the method further comprising:
    calculating a third value representing an average measure of the likelihood that a plurality of persons move to a subsequent stage in the one or more stages of the student life cycle; and
    calculating a fourth value representing an average measure of the appeal of a plurality of persons to the educational institution at the one or more stages of the student life cycle, wherein the third value and the fourth value are graphically displayed as a second point on the graph, and wherein the second point is plotted on the graph at the third value along the first axis and at the fourth value along the second axis.

5. The method of claim 1, wherein the history of interactions comprises an interaction recorded between the person and an interface provided by the educational institution.

6. The method of claim 1, further comprising associating a weight with each of the interactions in the history of interactions and the information about the person, wherein the weight is used to calculate the probability value and the desirability value.

7. The method of claim 1, wherein the history of interactions comprises at least one of the following: the number of times the person accesses an interface of the educational institution, the information surfed on the interface, whether the constituent has created an account to access the interface, whether the constituent has recently used the account to access the interface, whether the constituent has scheduled visits to the educational institution, whether the constituent has made telephone calls to the educational institution, whether the constituent applied to the educational institution, whether the constituent has requested application materials from the educational institution, whether the constituent attended an open house, whether the constituent attended an alumni event, and whether the constituent attended a departmental event.

8. The method of claim 1, wherein the information about the person comprises at least one of the following: test scores, test score percentiles, grade point average, legacy information, socioeconomic class, geographic location, extra curricular activities, gender, major, minor, concentration, military service, entry level, full time status, part time status, generation information, and economic contribution to the education institution.

9. A computer-readable storage medium, wherein the storage medium is not a signal, having computer-readable instructions for assisting an educational institution in rating a person in connection with one or more stages of a student life cycle, the computer-readable instructions comprising instructions for:
    receiving a history of interactions between the person and the educational institution;
    calculating, based in part on the history of interactions and information about the person, a probability value representing a measure of the likelihood that the person moves to a subsequent stage in the one or more stages of the student life cycle;
    calculating, based in part on the history of interactions and information about the person, a desirability value representing a measure of the appeal of the person to the educational institution at the one or more stages of the student life cycle; and
    graphically displaying the probability value and the desirability value as a point on a graph.

10. The computer-readable storage medium of claim 9, wherein the graph comprises a first axis representing the measure of the likelihood that the person moves to the subsequent stage in the one or more stages of the student life cycle and a second axis representing the measure of the appeal of the person to the educational institution at the one or more stages of the student life cycle.

11. The computer-readable storage medium of claim 10, wherein the point is plotted on the graph at the probability value along the first axis and at the desirability value along the second axis.

12. The computer readable storage medium of claim 11, wherein the point is a first point, wherein the computer-readable instructions further comprise instructions for:
    calculating a third value representing an average measure of the likelihood that a plurality of persons move to a subsequent stage in the one or more stages of the student life cycle; and
    calculating a fourth value representing an average measure of the appeal of a plurality of persons to the educational institution at the one or more stages of the student life cycle, wherein the third value and the fourth value are graphically displayed as a second point on the graph, and wherein the second point is plotted on the graph at the third value along the first axis and at the fourth value along the second axis.

13. The computer-readable storage medium of claim 9, wherein the history of interactions comprises an interaction recorded between the person and an interface provided by the educational institution.

14. The computer-readable storage medium of claim 9, wherein the computer-readable instructions further comprise instructions for associating a weight with each of the interactions in the history of interactions and the information about the person, wherein the weight is used to calculate the probability value and the desirability value.

15. The computer-readable storage medium of claim 9, wherein the history of interactions comprises at least one of the following: the number of times the person accesses an interface of the educational institution, the information surfed on the interface, whether the constituent has created an account to access the interface, whether the constituent has recently used the account to access the interface, whether the constituent has scheduled visits to the educational institution, whether the constituent has made telephone calls to the educational institution, whether the constituent applied to the educational institution, whether the constituent has requested application materials from the educational institution, whether the constituent attended an open house, whether the constituent attended an alumni event, and whether the constituent attended a departmental event.

16. The computer-readable storage medium of claim 9, wherein the information about the person comprises at least one of the following: test scores, test score percentiles, grade point average, legacy information, socioeconomic class, geographic location, extra curricular activities, gender, major, minor, concentration, military service, entry level, full time status, part time status, generation information, and economic contribution to the education institution.

17. A system for assisting an educational institution in rating a person in connection with one or more stages of a student life cycle, the system comprising:
- at least one storage area for program code;
- a processor for executing the program code, wherein the program code directs the system to perform the functions comprising:
- receiving a history of interactions between the person and the educational institution;
- calculating, based in part on the history of interactions and information about the person, a probability value representing a measure of the likelihood that the person moves to a subsequent stage in the one or more stages of the student life cycle;
- calculating, based in part on the history of interactions and information about the person, a desirability value representing a measure of the appeal of the person to the educational institution at the one or more stages of the student life cycle; and
- graphically displaying the probability value and the desirability value as a point on a graph.

18. The system of claim 17, wherein the graph comprises a first axis representing the measure of the likelihood that the person moves to the subsequent stage in the one or more stages of the student life cycle and a second axis representing the measure of the appeal of the person to the educational institution at the one or more stages of the student life cycle.

19. The system of claim 18, wherein the point is plotted on the graph at the probability value along the first axis and at the desirability value along the second axis.

20. The system of claim 19, wherein the point is a first point, wherein the program code further directs the system to perform the functions comprising:
- calculating a third value representing an average measure of the likelihood that a plurality of persons move to a subsequent stage in the one or more stages of the student life cycle; and
- calculating a fourth value representing an average measure of the appeal of a plurality of persons to the educational institution at the one or more stages of the student life cycle, wherein the third value and the fourth value are graphically displayed as a second point on the graph, and wherein the second point is plotted on the graph at the third value along the first axis and at the fourth value along the second axis.

21. The system of claim 17, wherein the history of interactions comprises an interaction recorded between the person and an interface provided by the educational institution.

22. The system of claim 17, wherein the program code further directs the system to perform the function comprising associating a weight with each of the interactions in the history of interactions and the information about the person, wherein the weight is used to calculate the probability value and the desirability value.

23. The system of claim 17, wherein the history of interactions comprises at least one of the following: the number of times the person accesses an interface of the educational institution, the information surfed on the interface, whether the constituent has created an account to access the interface, whether the constituent has recently used the account to access the interface, whether the constituent has scheduled visits to the educational institution, whether the constituent has made telephone calls to the educational institution, whether the constituent applied to the educational institution, whether the constituent has requested application materials from the educational institution, whether the constituent attended an open house, whether the constituent attended an alumni event, and whether the constituent attended a departmental event.

24. The system of claim 17, wherein the information about the person comprises at least one of the following: test scores, test score percentiles, grade point average, legacy information, socioeconomic class, geographic location, extra curricular activities, gender, major, minor, concentration, military service, entry level, full time status, part time status, generation information, and economic contribution to the education institution.

* * * * *